(12) United States Patent
Carrier et al.

(10) Patent No.: US 10,229,389 B2
(45) Date of Patent: Mar. 12, 2019

(54) SYSTEM AND METHOD FOR MANAGING COMMUNITY ASSETS

(75) Inventors: Scott R. Carrier, Apex, NC (US); Helena S. Chapman, Wellesley, MA (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1410 days.

(21) Appl. No.: 12/036,925

(22) Filed: Feb. 25, 2008

(65) Prior Publication Data
US 2009/0216581 A1 Aug. 27, 2009

(51) Int. Cl.
G06Q 10/00 (2012.01)
G06Q 10/10 (2012.01)
G06Q 10/06 (2012.01)

(52) U.S. Cl.
CPC ....... G06Q 10/10 (2013.01); G06Q 10/06315 (2013.01)

(58) Field of Classification Search
None
See application file for complete search history.

(56) References Cited

U.S. PATENT DOCUMENTS

| | | | |
|---|---|---|---|
| 5,379,423 A * | 1/1995 | Mutoh et al. | |
| 5,867,709 A * | 2/1999 | Klencke | 717/111 |
| 6,836,878 B1 * | 12/2004 | Cuomo et al. | 717/100 |
| 6,898,791 B1 * | 5/2005 | Chandy et al. | 719/314 |
| 7,039,898 B2 * | 5/2006 | Shah | 717/107 |
| 7,130,863 B2 * | 10/2006 | Diab | |
| 7,472,110 B2 * | 12/2008 | Achlioptas | |
| 7,546,576 B2 * | 6/2009 | Egli | 717/106 |
| 7,788,674 B1 * | 8/2010 | Siegenfeld | 719/313 |
| 2003/0236658 A1 * | 12/2003 | Yam | 704/2 |
| 2004/0117759 A1 * | 6/2004 | Rippert, Jr. | G06F 8/20 717/100 |
| 2004/0172612 A1 * | 9/2004 | Kasravi et al. | 717/101 |
| 2004/0254951 A1 * | 12/2004 | Bloesch | G06Q 10/00 |
| 2005/0198026 A1 * | 9/2005 | Dehlinger | G06F 17/2881 |
| 2006/0069675 A1 * | 3/2006 | Ogilvie | G06F 17/30864 |
| 2007/0240102 A1 * | 10/2007 | Bello et al. | 717/104 |
| 2007/0250492 A1 * | 10/2007 | Angel | G06F 17/3097 |
| 2007/0288448 A1 * | 12/2007 | Datta | 707/5 |
| 2007/0299825 A1 * | 12/2007 | Rush et al. | 707/3 |

(Continued)

OTHER PUBLICATIONS

Wikipedia, Folksonomy, pp. 1-5, available at http://en.wikipedia.org/wiki/Folksonomy, last visited Feb. 25, 2008.

*Primary Examiner* — John W Hayes
(74) *Attorney, Agent, or Firm* — Kunzler, PC

(57) ABSTRACT

A system and method to manage a community development asset. The system includes an asset polling agent, a nomenclature taxonomy dictionary, and an asset discovery service. The asset polling agent identifies a descriptive term associated with an asset under development. The nomenclature taxonomy dictionary stores a list of synonym terms related to the descriptive term associated with the asset under development. The asset discovery service identifies a reusable asset of a plurality of reusable assets for use with the asset under development based on at least one term, from a combination of the descriptive term and the list of synonym terms related to the descriptive term, extracted from social network data.

15 Claims, 6 Drawing Sheets

(56) References Cited

U.S. PATENT DOCUMENTS

2008/0120129 A1\* 5/2008 Seubert et al. .................. 705/1
2008/0256509 A1\* 10/2008 Mazzeranghi ................ 717/106
2010/0094792 A1\* 4/2010 Prestigiacomo ................ 706/46

\* cited by examiner

SYSTEM AND METHOD FOR MANAGING COMMUNITY ASSETS

BACKGROUND OF THE INVENTION

It is not unusual for distributed teams to work together virtually in a team space. Typical collaborative activities involve the development of a software asset, as well as consumption of the asset in a way that is cost effective. There are many social networking software programs and other tools that allow an asset provider and asset consumers to connect or collaborate through computer technology. Often, conventional collaboration takes place in more than one team area of the same project corresponding to the asset that is produced. For example, a project may use team room, a wiki, and a blog (or some other collaboration space) to reach out to the appropriate user community. Information about a software asset can be duplicated in all these places, and users may need to monitor all applicable communication channels to ensure the integrity of information published. The benefits of social networking tools sometimes also bring the challenges for users to identify which team areas are indeed worth close monitoring and which team areas only warrant casual engagement.

A social networking service is often a web based internet/intranet collaboration/information sharing service. The shared information is often accessible to the public. Additionally, other people with similar interests can view the information by category or tags of a folksonomy. Most conventional social networking services have algorithms to implement the concept of inference from the tag by examining the clustering of particular tags and, hence, finding relationships between one another. An important element in most of these services is the concept of a person's community, which means providing a way to rank query results based on the person's social network, which includes direct associates and more distant associates separated by degrees. Most of these conventional social networking services provide aggregate news feeds of places, filtered by tags, that a person's social network finds interesting. Many conventional social networking services also provide ways to attach comments and/or ratings to items indexed by the tags. It should be noted that the tags themselves also have a community, which includes the collection of people who use a tag to describe an object. Similarly, the objects also have a community, which includes the people who tag a particular object.

Given the successes of the open source software (OSS) approach to software development, many firms have started to implement the best practices of OSS to traditional closed-source development. An open collaborative development approach enables a single firm to leverage skills of all of its employees to benefit the entire organization, or at least a relatively large portion of the organization. With an open collaborative environment for development teams, harvesting software assets for reuse (e.g., in derivative applications) is facilitated and often encouraged. However, the ability to reuse a software asset can be complicated by a user's ability or inability to make a meaningful decision whether a software asset is appropriate to reuse with a new asset under development.

Also, in an OSS development environment paradigm, software engineers are accustomed to swapping code. However, code swapping is often done on an ad hoc basis. Even with well-planned attempts to reuse software assets, the development process often relies on manual labor on behalf of both the asset provider and the asset consumer. The ability of a developer to advertise the developer's assets for an asset consumer, so that the asset consumer can quickly find relevant assets using the consumer's terminology, remains difficult. Hence, it can be easier to write a new piece of software from scratch, rather than trying to search for an appropriate asset for reuse.

Some of the conventional tools and environments support collaborative community based software development with version control. Some of the conventional tools and environments also use asset repositories with fixed taxonomies, which implement rigid classification and allow for faceted searches of packaged parts. There are also searchable websites for development projects which, for larger assets like applications, allowing standard Internet techniques to be used for finding specific parts. Thus, although asset reuse can be part of the software development process, the conventional tools to facilitate asset reuse are not cost effective and do not add significantly to the competitive position of an organization.

SUMMARY OF THE INVENTION

Embodiments of a system are described. In one embodiment, the system is a system to manage a community development asset. An embodiment of the system includes an asset polling agent, a nomenclature taxonomy dictionary, and an asset discovery service. The asset polling agent identifies a descriptive term associated with an asset under development. The nomenclature taxonomy dictionary stores a list of synonym terms related to the descriptive term associated with the asset under development. The asset discovery service identifies a reusable asset of a plurality of reusable assets for use with the asset under development based on at least one term from a combination of the descriptive term and the list of synonym terms related to the descriptive term.

In some embodiments, the asset polling agent also delivers the identified reusable asset to a development work environment for the asset under development. In some embodiments, the system also includes a reusable asset index to store the plurality of reusable assets. In some embodiments, the reusable asset index also indexes the plurality of reusable assets based on a plurality of canonical terms. In some embodiments, the system also includes an asset index crawler to identify the plurality of reusable assets from at least one asset repository.

In some embodiments, the system also includes a nomenclature taxonomy crawler to create a taxonomy associated with the plurality of reusable assets. The taxonomy includes the descriptive term associated with the asset under development and the list of synonym terms related to the descriptive term. In some embodiments, the nomenclature taxonomy crawler also maps the descriptive term associated with the asset under development and the list of synonym terms related to the descriptive term within a nomenclature taxonomy dictionary. In some embodiments, the nomenclature taxonomy crawler also maps sets of terms from separate nomenclatures within a social network related to at least one of the plurality of reusable assets. Other embodiments of the system are also described.

Embodiments of a method are also described. In one embodiment, the method is a method for managing a community asset. An embodiment of the method includes identifying a descriptive term associated with an asset under development and querying a plurality of reusable assets based on a query term. The query term is related to the descriptive term associated with the asset under development. The method also includes identifying a reusable asset, of the plurality of reusable assets, for use in conjunction with the asset under development based on the query term. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Figure 1:
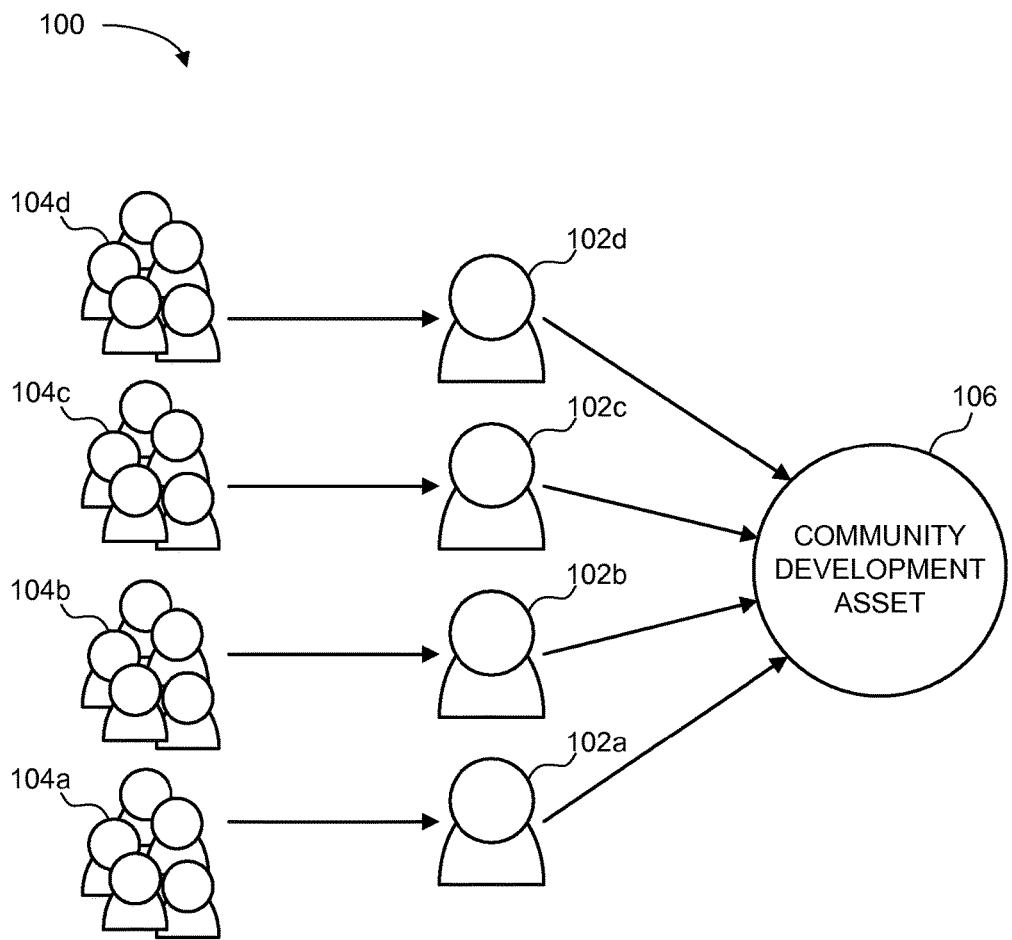
FIG. 1 depicts a schematic diagram of one embodiment of a community development network.

FIG. 1 depicts a schematic diagram of one embodiment of a community development network 100. In particular, the community development network 100 includes users 102a-d, and the users' associated communities 104a-d, that are associated with a community development asset 106. The community development asset 106 may be a software asset that is produced and/or consumed within the community development network 100. The users 102 may include asset owners such as developers and quality assurance and technical support users. The users 102 also may include direct and indirect consumers.

Each user 102 has an associated community 104. The community 104 associated with a particular user 102 may be defined by the social network of the user 102, the involvement of the user 102 in one or more projects, and/or the placement of the user 102 within an organizational hierarchy of some kind. Additionally, it should be noted that the communities 104 associated with several users 102 may at least partially overlap, within the context of the community development asset 106 and the community development network 100.

Figure 2:
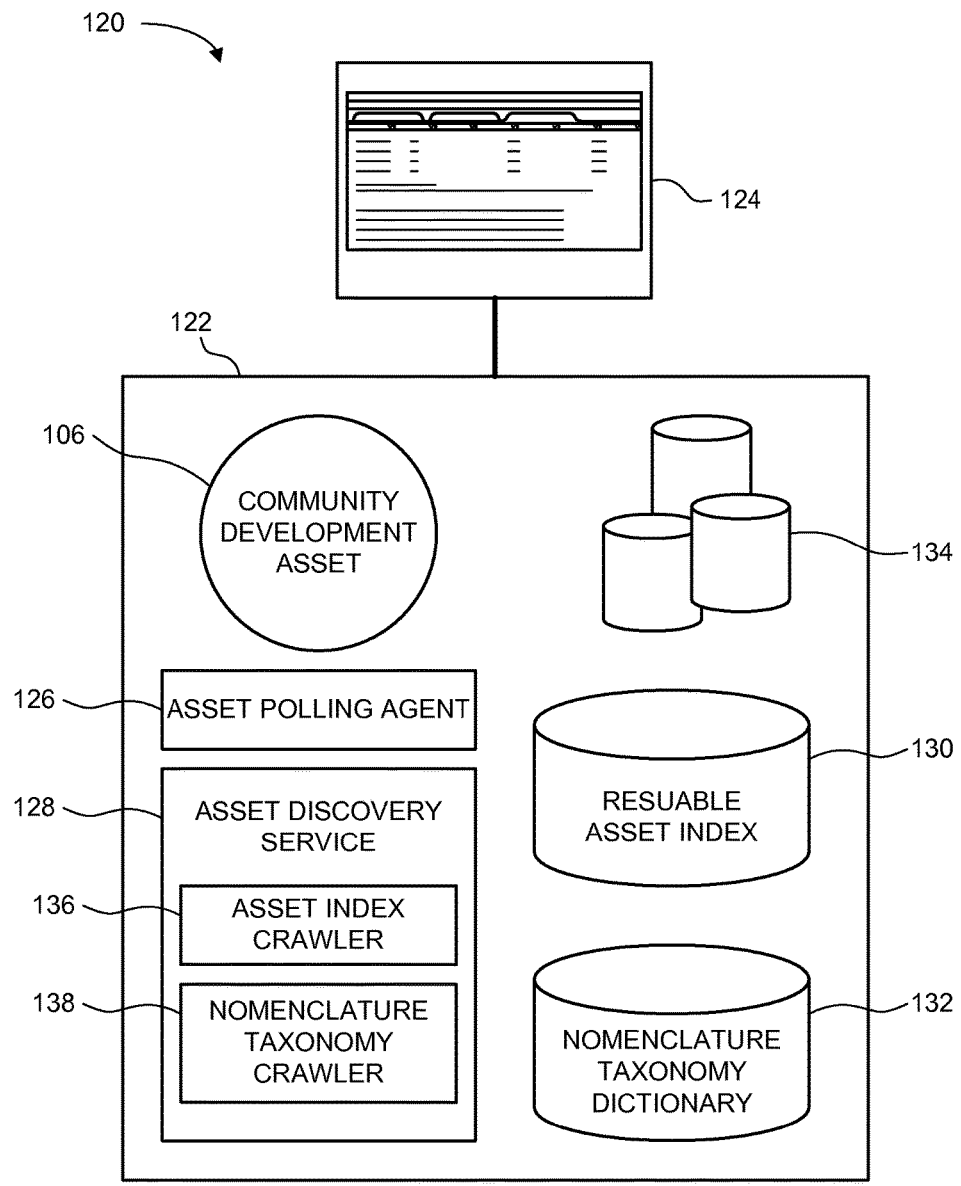
FIG. 2 depicts a schematic block diagram of one embodiment of an asset management system for managing a community asset.

FIG. 2 depicts a schematic block diagram of one embodiment of an asset management system 120 for managing a community asset 106. Although certain components of the asset management system 120 are shown and described herein, other embodiments may implement fewer or more components and provide more or less functionality than the asset management system 120 shown in FIG. 2.

The illustrated asset management system 120 includes a collaborative development network device 122 and a display device 124 coupled to the collaborative development network device 122. The illustrated collaborative development network device 122 includes the community development asset 106, an asset polling agent 126, and an asset discovery service 128. The illustrated collaborative development network device 122 also includes a reusable asset index 130, a nomenclature taxonomy dictionary 132, and a plurality of asset repositories 134. The asset discovery service 128 includes an asset index crawler 136 and a nomenclature taxonomy crawler 138.

In general, the collaborative development network device 122 facilitates development of the community development asset 106, or another shared asset. In some embodiments, the collaborative development network device 122 facilitates asset publishing which allows an asset developer to publish one or more reusable assets so that other developers may discover the reusable assets and incorporate them into new community development assets. As an example, the collaborative development network device 122 may allow an asset developer to find a small programming component such as a subroutine or an object and incorporate the component into the development work environment, or the developer's workbench. In one embodiment, the development work environment is displayed via the display device 126.

In some embodiments, the ability to find reusable assets is automated so that the asset developer does not have to initiate a query in order to benefit from one or more reusable assets. This type of automation differs from conventional community development network solutions because conventional development network solutions rely on the actions of a participant to discover and tag an asset before the asset becomes available to other members of the community development network. By relying on the individual developers to find and tag specific assets that may be reused, the asset cannot be easily accessed within the community development network until it is tagged with descriptive metadata by one of the network members. Even after the asset is tagged, finding the asset for reuse may be difficult because the terms used in the descriptive metadata may be different from the terms used in a query to find the tagged asset.

In contrast to conventional development network solutions, embodiments of the collaborative development network device 122 automatically deliver information about reusable assets directly to the development work environment (i.e., an integrated development environment (IDE)) for an asset developer, without the need for the asset developer to initiate a query. Embodiments of the collaborative development network device 122 allow an asset to be described and tagged by the asset developer, as well as other developers who have access to the community asset. The various descriptions for the tagged asset may then be mapped together, or normalized, so that the descriptions provided by the asset developer and other developers are correlated to facilitate better discovery of the reusable asset.

Additionally, some embodiments of the collaborative development network device 122 integrate this reusable asset query functionality directly into the development work environment so that reusable asset suggestions may be provided during the development process of an asset. The reusable asset suggestions are intended to present possible assets for reuse in conjunction with the asset under development, in order to improve the development efficiency of the asset under development. As one example, the reusable asset suggestions may be provided to the asset developer in a similar manner as conventional spelling and code completion suggestions, which offer one or more suggested completions for a particular query. Hence, embodiments of the collaborative development network device 122 use hints from the developer's activities in order to find potentially related reusable assets, which may be presented to the asset developer for reuse with the asset under development. In some embodiments, multiple suggested reusable assets may be preferentially ordered in a list, or other hierarchical format, based on a computed "best fit" with the asset under development. In this way, the collaborative development network device 122 automates the promotion and integration of available reusable assets.

In one embodiment, the asset polling agent 126 identifies a descriptive term associate with an asset under development. As described above, the descriptive term may be any type of metadata associated with the asset under development. In some embodiments, the asset polling agent 126 may extract a set of descriptive terms for a given asset.

In one embodiment, the asset discovery service 128 identifies a reusable asset of a plurality of reusable assets. In particular, the asset discovery service 128 identifies the reusable asset for use with the asset under development. After one or more assets are identified by the asset discovery service 128, the asset polling agent 126 delivers the identified reusable asset to the development work environment for the asset of development. In other words, the asset polling agent 126 delivers the identified reusable asset to the asset developer so that the asset developer can determine whether or not to use the reusable assets in conjunction with the asset under development. In this way, the identified reusable asset may be used to complete the asset under development or, in some embodiments, replace the asset under development, in order to save time with the asset developer. In other embodiments, the identified reusable asset is used in another matter in conjunction with the asset under development.

In one embodiment, the plurality of reusable assets are stored in the asset repositories 134. In another embodiment, the reusable asset index 130 also stores the plurality of reusable assets. Alternatively, the reusable asset index 130 may store and index, or list, the reusable assets which are stored in the asset repositories 134. In some embodiments, the reusable asset index 130 indexes the plurality of reusable assets based on a plurality of canonical terms. The canonical terms may be any of the descriptive terms associated with the corresponding reusable assets. In one embodiment, the canonical terms are normalized descriptive terms from the nomenclature taxonomy dictionary 132.

In one embodiment, the nomenclature taxonomy crawler 138 of the asset discovery service 128 creates a taxonomy associated with the plurality of reusable assets. The taxonomy may include the descriptive term associated with the asset under development, as well as a list of synonym terms related to the descriptive term. As described above, the descriptive term or any of these synonym terms may be used as a canonical term to index a corresponding reusable asset in the reusable asset index 130.

In some embodiments, the nomenclature taxonomy crawler 138 maps the descriptive term associated with the asset under development with the list of synonym terms related to the descriptive term within the nomenclature taxonomy dictionary 132. In this way, the nomenclature taxonomy dictionary 132 stores a nomenclature taxonomy, or an ordered list of descriptive terms, for the reusable assets indexed in the reusable asset index 130.

In one embodiment, the nomenclature taxonomy crawler 138 also maps sets of terms from separate nomenclatures within a social network related to at least one of the plurality of reusable assets. In other words, the nomenclature taxonomy crawler 138 may extract descriptive terms for various reusable assets from social network data that is identified as being related to the various reusable assets. In this way, the nomenclature taxonomy crawler 138 is able to identify and aggregate various descriptive terms that are used by different individuals within a social network to describe each of the reusable assets. Since different people within the social network will likely describe the same reusable asset using different language, the nomenclature taxonomy crawler 138 facilitates normalization of the various descriptive terms by identifying the terms within a social network and mapping the terms to one another within the nomenclature taxonomy dictionary 132.

In one embodiment, the asset index crawler 136 identifies reusable assets from a least one of the asset repositories 134 within a social network. Although several asset repositories 134 are shown within the community development network device 122, the asset index crawler 136 may be able to access other asset repositories which are stored on other community development network devices 122 within a particular community development network.

In some embodiments of the community development network device 122, the asset index crawler 136 and the nomenclature taxonomy crawler 138 may be combined as a single crawler device. There is a plethora of information which the crawlers 136 and 138, either together or individually, can collect and analyze for use in indexing reusable assets based on the artifacts of the assets. Although the specific artifacts associated with a particular asset may depend on the type of asset which is analyzed, exemplary artifacts may include lines of code, adherence to proper code formatting and code rules, licensing, pedigree, and so forth.

Additionally, in some embodiments, using either @author comment tags or concurrent versions systems/subversion (CVS/SVN) check-in auditing, the crawlers 136 and 138 may fetch information from social networks regarding the actual developers of the code for use in filtering the best fit reusable asset for a given developer and his/her preferences. Using the social network data of the developer's social network may be advantageous, in some embodiments, because users may be more comfortable using an asset developed by a friend such as a respected colleague within the developer's social network. Also, a particular component developer may be easily accessible (e.g., reside nearby), making it relatively easy to interact face-to-face, if desired. In contrast, developers located at a geographical distance may actually be, or may be perceived to be, less accessible than developers located nearby.

In some embodiments, using social networks allows speedy community development network device 122 to allowing in mid-development artifacts with existing assets within multiple tiers of information. A first exemplary tier includes the suitability of available components for reuse (e.g., compatible language, architecture, etc.). A second exemplary tier includes human relationship factors between the asset developer building a new application and the developer or developers of existing components that are suitable for reuse in the new application under development. In some instances, a third tier also may be defined. In this third tier, the history of asset developers building a new application may be tracked, and the development habits of the asset developers may be taken into account when screening for potential reusable components. As one example, developers often have different styles of naming conventions, code structure, and philosophies regarding object-oriented programming. These differences may be very granular in regard to, for example, average method size, package file count, and so forth. Based on explicit work history of a developer and/or prior choices of assets accepted for reuse, embodiments of the community development network device 122 may learn the habits of developers and continually hone the suggestions tailored to the developer's development habits.

In one embodiment, the display device 124 is configured to display at least one of the identified reusable assets to an asset developer. In particular, the display device 124 may display the identified reusable assets within a development work environment for an asset under development. Additionally, the display device 124 may display multiple identified reusable assets, within the development work environment, according to a preferential order of the identified reusable assets for use with the asset under development. In one embodiment, a preferential order of the list of identified reusable assets is based on a proposed best fit for the asset under development.

In determining a best fit for the asset under development, there may be several factors used to identify the scope (or granularity) of an indexed asset. Specifically, there may be several factors in deciding the matching of an asset between the providers and potential consumers. For convenience, the relevance of an asset in this relationship is referred to as "scope." In one embodiment, the scope defines how an asset may be presented to a potential consumer and can be customized based on the importance of how an asset may be valued both by the providers and the consumers. One level of scope might be how the asset can be leveraged. For instance, a code asset implemented as a rich client application may be more suitable for solutions under development that operate with a low dependency on remote server processing for performance reasons. In that case, an asset implemented purely in leveraging remote server capabilities may not be suitable for this reuse.

Furthermore, a dependency graph inherent in the indexed tree structure may detail whether a component is stand-alone or dependent on other components. In one embodiment, if a component depends on other components, the collective set of components used to satisfy all of the dependencies constitutes one level of scope, when comparing one asset with another asset. Another level of scope may be an applicability percentage of a given asset towards the performance specifications of an asset under development for a particular solution. For example, one asset might be 80% applicable towards a component currently being drafted by a developer, while another asset might be 50% applicable towards a given solution. Another level of scope may be the nature of invocation concerning an asset. For example, an API implemented using Enterprise JavaBeans (EJB) or Web Services Description Language (WSDL), as opposed to a Plain Old Java Object (POJO), allows for the service to be hosted remotely. This potentially alleviates the burden of hosting the solution entirely on a local server.

From the asset consumer perspective, the scope and character of a given component or application being developed in real time is used to determine "best fit" potential asset for reuse. For example, if a developer is currently developing a webpage, and existing assets identified for potential reuse include a JavaScript widget and a *.war file, then the JavaScript widget might be a more appropriate solution. Therefore, the JavaScript widget may be proposed, in this situation, as the best fit potential asset for reuse. In another embodiment, if the developer is working on a portlet project for a WebSphere portal, then the *.war might be a more appropriate solution for proposal as the best fit asset for reuse, especially if the portlet project is a portlet *.war project.

In some embodiments, the display device 124 also displays one or more hyper-links to the identified reusable assets. In this way, when the asset developer is interested in learning more about the identified reusable assets, the asset developer can follow the embedded links to find the reusable asset and/or additional information about the reusable asset.

Figure 3:
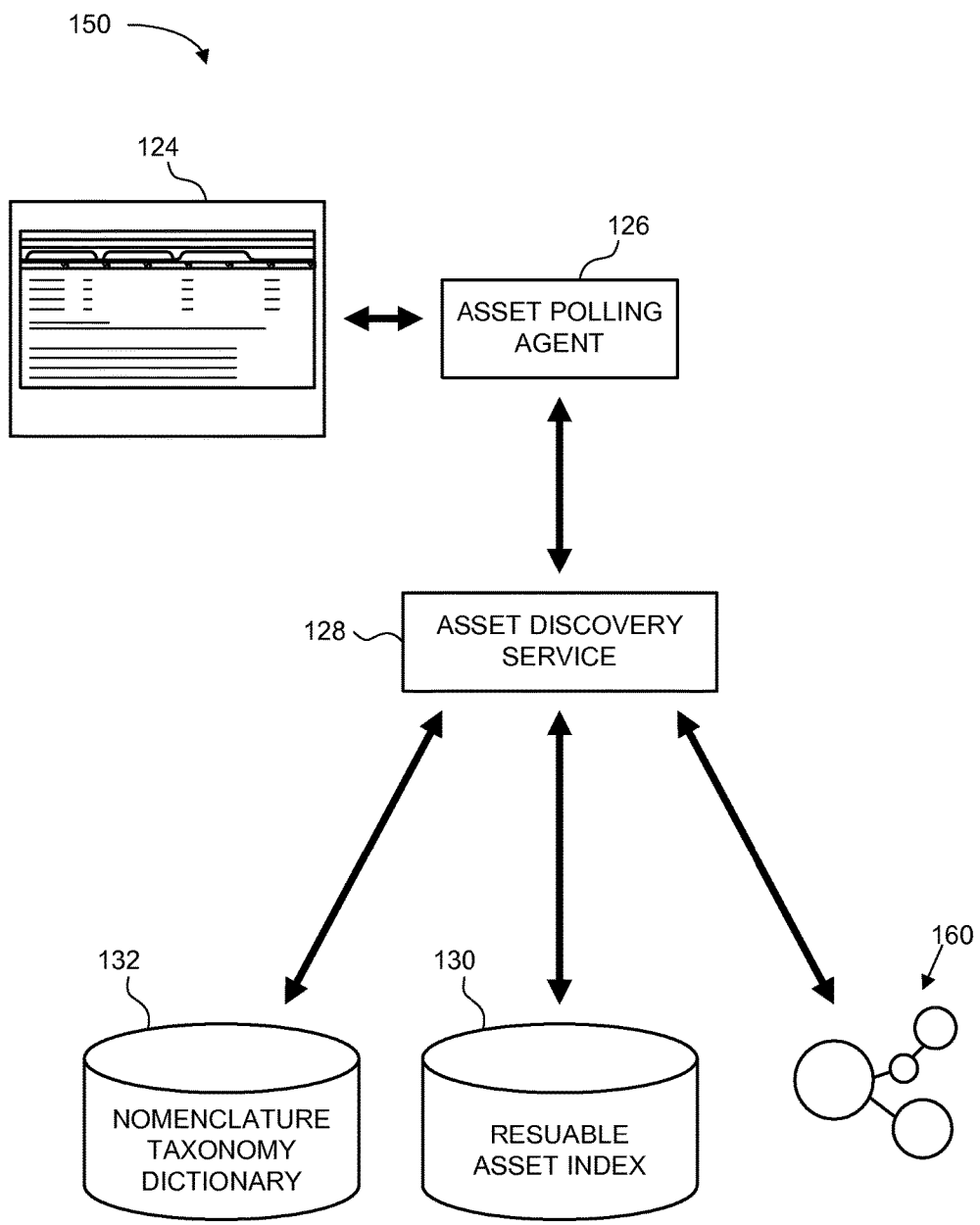
FIG. 3 depicts a schematic process flow diagram of one embodiment of the asset management system of FIG. 2.

FIG. 3 depicts a schematic process flow diagram 150 of one embodiment of the asset management system 120 of FIG. 2. The illustrated process flow diagram 150 depicts interactions among various components of the asset management system 120. Some embodiments of the asset management system 120 may be capable of implementing additional functionality, in addition to be functionality described in conjunction with the process flow diagram 150.

In one embodiment, the asset polling agent 126 interfaces with the development work environment, which may be displayed on the display device 124. The asset polling agent 126 automatically infers descriptive data points, or terms, for an asset under development within the development work environment. The descriptive terms may be used by the asset discovery service 128 for asset discovery operations. In one embodiment, the asset polling agent 126 infers descriptive terms from uniform modeling language (UML) diagrams, class parameters, or other metadata for the asset under development. Using these descriptive terms, the asset polling agent 126 polls the asset discovery service 128 for one or more available reusable assets. In one embodiment, the asset polling agent 126 specifically polls the asset discovery service 128 for a sorted list of available "best fit" reusable assets.

Additionally, in some embodiments, the asset polling agent 126 runs automatically on behalf of the end-user (e.g., the asset developer) and does not require any manual intervention. Unlike a conventional search for reusable assets, the asset polling agent 126 automatically initiates the polling request to the asset discovery service 128 based on one or more descriptive terms inferred from the asset under development.

In response to the polling request from the asset polling agent 126, the asset discovery service 128 queries the nomenclature taxonomy dictionary 132 for a list of synonym terms which are related to the descriptive term or terms identified by the asset polling agent 126 for the asset under development. In one embodiment, the synonym terms are mapped with a descriptive term or terms within the nomenclature taxonomy dictionary 132. The mapping within the nomenclature taxonomy dictionary 132 may be based on common use of the mapped terms to refer to the same or similar community assets. In one embodiment, the nomenclature taxonomy crawler 136 intelligently infers certain parameters of candidate reusable assets directly from artifacts of the candidate reusable assets. Exemplary artifacts which may be used to determine descriptive terms of a reusable asset include, but are not limited to, application program interfaces (APIs), comments, UML diagrams, and other artifacts defined by the asset developers within the community development network.

In one embodiment, the asset discovery service 128 uses the list of synonym terms from the nomenclature taxonomy dictionary 132 to query the reusable asset index 130 for one or more reusable assets associated with a set of synonym terms retrieved from the nomenclature taxonomy dictionary

132. For example, an asset may be identified by the asset provider as "network thru-put threshold management," and the nomenclature taxonomy dictionary 132 automatically filters out the input phrases from potential consumers or other solution providers such as "system capacity management" or "maximum possible output administration" to be equivalent to each other. The asset discovery service 128 then uses the set of synonym terms to retrieve all the assets with the similar functions described in those terms.

The asset discovery service 128 uses the set of candidate reusable assets retrieved from the reusable asset index 132 to initiate an analysis, according to the social network data available in a user's social network 160, to determine a best fit sorted list of available assets for reuse. An example of a user's social network 160 is the community of people associated with an asset developer. In one embodiment, the community of people associated with an asset developer may be identified from various social network sources, including folksonomy associates, lists of project team members for projects in which the developer participates, personal instant messaging (IM) groups and messaging histories, personal email address books and email transmission histories, blogs to which the developer posts entries, wikis in which the developer participates, and other similar sources. In one embodiment, folksonomy associates include people who often use the same or similar tags for pages in a social bookmark network.

Thus, the social network data may be used in various ways to influence the functionality of the asset discovery service 128. In one embodiment, the social network data may be used to find reusable assets and to populate the nomenclature taxonomy dictionary 132 with corresponding descriptive terms for the reusable assets found within social network 160. Additionally, the social network data may be used to evaluate various criteria from other individuals within the social network 160 to sort a subset of the indexed reusable assets in a preferential order for presentation to an asset developer for an asset under development. Other embodiments of the asset management system 120 may use the social network data in other ways to enhance the functionality of the asset polling agent 126 and/or the asset discovery service 128.

Embodiments of the asset management system 120 are also used to automatically advertise new assets within the social network 162 to various parties, or communities, within the social network 160. In particular, as new assets are developed, the new assets are indexed within the reusable asset index 130, and corresponding descriptive terms are mapped within the nomenclature taxonomy dictionary 132. This means that the new asset is common in some embodiments, immediately available for discovery by various development work environments within the collaborative development network. Accordingly, embodiments of the asset management system 120 address the issue of how to insert new assets with descriptive metadata using a structured taxonomy into the collaborative development network. By organizing a taxonomy according to the language used by a virtual developer representative of a community that creates a tag set, new and existing assets, under various differing nomenclatures, can be integrated automatically into the collaborative development network.

As one example, a community development network may include three people, designated as person A, person B, and person C. Person A and person B may describe the same asset, developed by person B, using different descriptive terms. For instance, a characteristic of the asset which person B considers as a "communication" capability may be referred to by person A as a "communication API." Similarly, person B may describe the asset as having a particular "network throughput," while person A may refer to the same characteristics as "transmission control protocol (TCP) tuning." So, in this example, the asset developed by person B may be indexed within the reusable asset index 130, and the various descriptions used by person A and person B may be mapped together within the nomenclature taxonomy dictionary 132.

Figure 4:
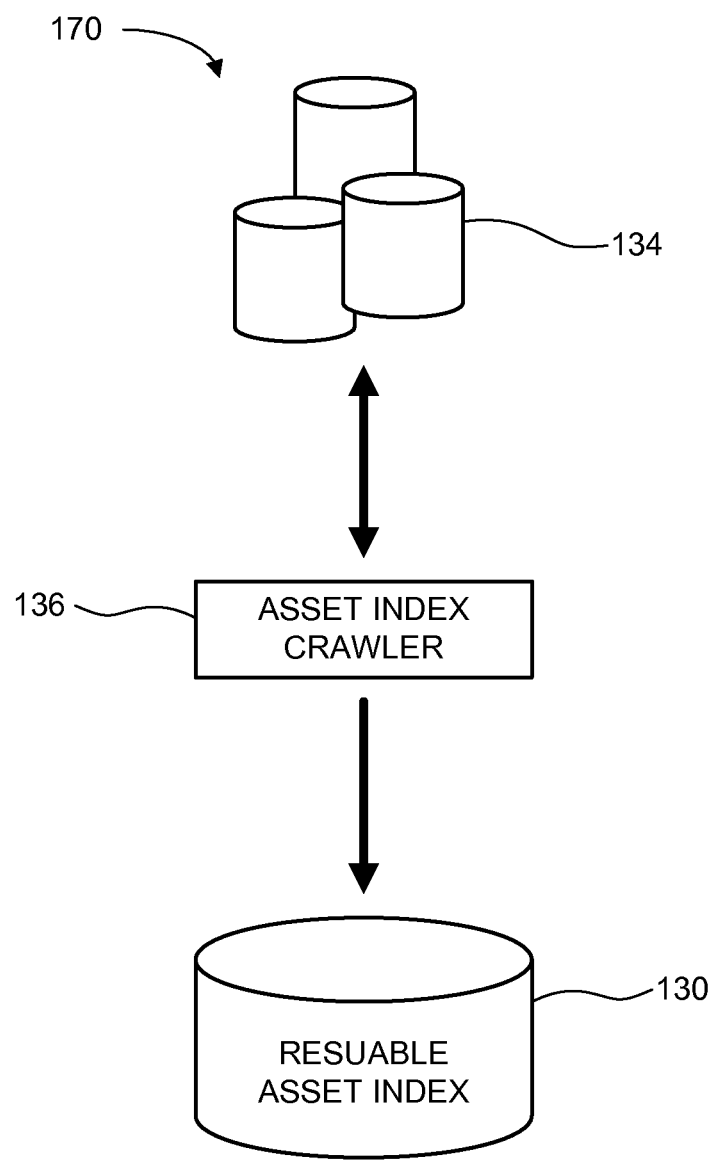
FIG. 4 depicts a schematic process flow diagram of one embodiment of the asset index crawler for the reusable asset index of FIG. 2.

FIG. 4 depicts a schematic process flow diagram 170 of one embodiment of the asset index crawler 136 for the reusable asset index 130 of FIG. 2. In particular, the illustrated process flow diagram 170 depicts interactions among the asset index crawler 136, at least one of the asset repositories 134, and the reusable asset index 130.

In one embodiment, the asset index crawler 136 scans the asset repositories 134 to identify one or more reusable assets. In some embodiments, the asset index crawler 136 scans the asset repositories 134 in a similar manner to a conventional search engine crawler which scans the Internet for searchable data. The asset index crawler 136 also may identify descriptive terms which are used to describe the corresponding assets in the asset repositories 134.

The asset index crawler 136 then indexes the identified assets available for reuse. In one embodiment the reusable assets are indexed according to the canonical terms collected from various social network sources, including metadata from the developer of the asset, metadata of the asset itself, and so forth.

Figure 5:
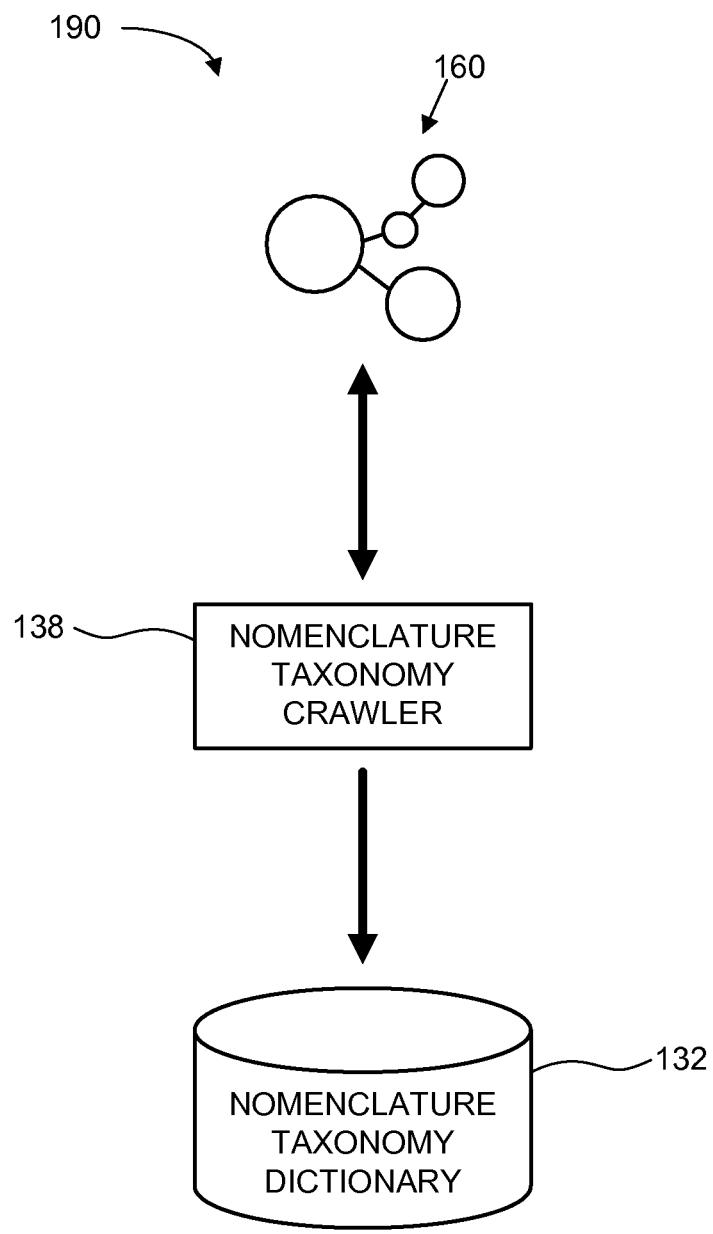
FIG. 5 depicts a schematic process flow diagram of one embodiment of the nomenclature taxonomy crawler for the nomenclature taxonomy dictionary of FIG. 2.

FIG. 5 depicts a schematic process flow diagram 190 of one embodiment of the nomenclature taxonomy crawler 138 for the nomenclature taxonomy dictionary 132 of FIG. 2. In particular, illustrated process flow diagram 190 depicts interactions among the nomenclature taxonomy crawler 138, the social network data from the social network 160, and the nomenclature taxonomy dictionary 132.

In one embodiment, the nomenclature taxonomy crawler 138 navigates the social network data to create a taxonomy of virtual communities based on the usage of common nomenclature within the corresponding social network communities. In some embodiments, nomenclature partitions can be derived from terminology used in various Web 2.0 tag content resources such as blogs, wikis, bookmarks, and other social network sources.

The nomenclature taxonomy crawler 138 uses the descriptive terms gleaned from the social network data to compile the nomenclature taxonomy dictionary 132. As described above, the nomenclature taxonomy dictionary 132 includes descriptive terms and their correlation to other descriptive terms, or synonyms, used in the nomenclature of various groups within the taxonomy. This enables the nomenclature taxonomy crawler 138 to map terms used in one nomenclature for describing an asset with terms used in other nomenclatures which reference the same or similar assets.

Figure 6:
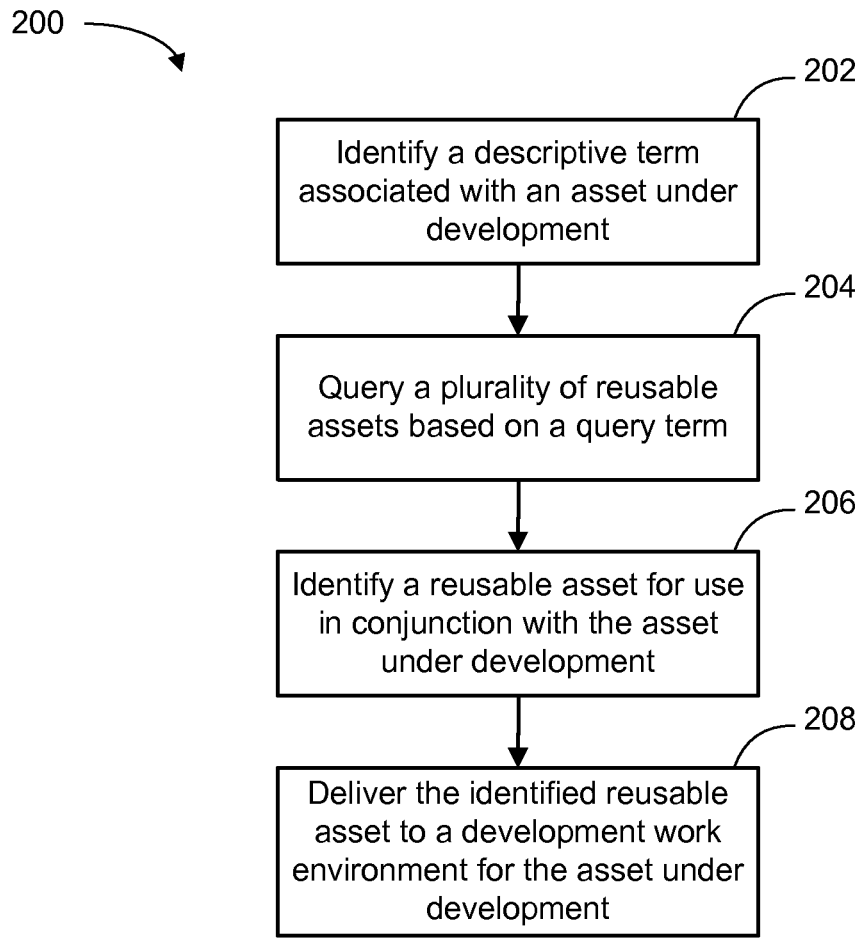
FIG. 6 depicts a schematic flow chart diagram of one embodiment of an asset management method for managing a community asset.

FIG. 6 depicts a schematic flow chart diagram of one embodiment of an asset management method 200 for managing a community asset. For ease of explanation, the asset management method 200 is described with reference to the asset management system 120 of FIG. 2. However, some embodiments of the asset management method 200 may be implemented with other asset management systems.

In general, the asset management method 200 includes identifying a descriptive term associated with an asset under development, querying a plurality of reusable assets based on a query term, and identifying a reusable asset, of the plurality of reusable assets, for use in conjunction with the asset under development based on the query term. As described above, the query term is related to the descriptive term associated with the asset under development.

In a more detailed embodiment illustrated in FIG. 6, the asset polling agent 126 identifies 202 a descriptive term associated with an asset under development. The asset discovery service 128 then queries 204 a plurality of reusable assets based on a query term, which is the same as, or derived from, the descriptive term associated with the asset under development. The asset discovery service 128 then identifies 206 a reusable asset for use in conjunction with the asset under development. In one embodiment, the asset discovery service 128 delivers the identified at reusable asset to the asset polling agent 126 in response to the initial polling request from the asset polling agent 136. The asset polling agent 126 then delivers 208 the identified reusable asset to a development work environment for the asset under development. The depicted asset management method 200 then ends.

It should also be noted that at least some of the operations for the asset management system 120 and/or the asset management method 200 may be implemented using software instructions stored on a computer useable storage medium for execution by a computer. As an example, an embodiment of a computer program product includes a computer useable storage medium to store a computer readable program that, when executed on a computer, causes the computer to perform one or more operations. In one embodiment, the operations include operations to identify a descriptive term associated with an asset under development and query a plurality of reusable assets based on a query term. The query term is related to the descriptive term associated with the asset under development. The operations also include an operation to identify a reusable asset, of the plurality of reusable assets, for use in conjunction with the asset under development based on the query term, Further embodiments of the computer program product include an operation to deliver the identified reusable asset to a development work environment for the asset under development. Another embodiment includes an operation to deliver the identified reusable asset to the development work environment as a suggested reusable asset for completion of the asset under development. Another embodiment includes an operation to deliver the identified reusable asset to the development work environment in a list of suggested reusable assets. Another embodiment includes an operation to arrange the list of suggested reusable assets, including the identified reusable asset, in a sorted preferential order based on a proposed best fit for the asset under development.

In one embodiment, the query term includes the descriptive term associated with the asset under development. In another embodiment, the operations include an operation to identify the query term from a plurality of terms associated with the descriptive term, in which the query term includes a term other than the descriptive term associated with the asset under development. Another embodiment includes an operation to store the descriptive term and the plurality of terms associated with the descriptive term in a nomenclature taxonomy dictionary. Another embodiment includes operations to identify a candidate reusable asset of the plurality of reusable assets, identify a social network associated with the candidate reusable asset, identify terminology, from within the social network, which is descriptive of the candidate reusable asset, and store the terminology descriptive of the candidate reusable asset in a nomenclature taxonomy dictionary. Another embodiment includes an operation to map a first descriptive term of a first nomenclature of the terminology descriptive of the candidate reusable asset to a second descriptive term of a second nomenclature of the terminology descriptive of the candidate reusable asset.

Another embodiment includes an operation to index the plurality of reusable assets. As one example, the plurality of reusable assets may be indexed based on a plurality of canonical terms. Another embodiment includes an operation to store the plurality of canonical terms with the indexed plurality of reusable assets. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium which stores a computer readable program that, when executed on a computer, causes the computer to perform operations to manage community development assets, the operations comprising:

dynamically inferring a descriptive term that describes an asset under development from within an integrated development environment using metadata associated with the asset under development, the metadata comprising one or more of uniform modeling language diagrams, application programming interfaces, comments, and class parameters for the asset that is being developed, the asset under development comprising a source code asset;

extracting a plurality of synonym terms for the descriptive term from social network data associated with developers of a plurality of reusable assets based on one or more of author comment tags and version control system auditing information, the plurality of reusable assets comprising portions of source code that can be integrated into the asset under development within the integrated development environment;

normalizing the plurality of synonym terms by identifying different synonym terms within the social network data that each describe the same reusable asset in a different language and mapping the different synonym terms to one another;

describing at least one of the plurality of reusable assets based on the plurality of synonym terms;

identifying a query term comprising at least one of the plurality of synonym terms related to the descriptive term;

querying the plurality of reusable assets based on the query term, the plurality of reusable assets stored and indexed in one or more asset repositories;

identifying a reusable asset, of the plurality of reusable assets, using an asset index crawler configured to access the one or more asset repositories to identify the reusable asset, the identification being based on results of the query, the identified reusable asset being for use in conjunction with the asset under development;

delivering the reusable asset to the integrated development environment to be presented as a reusable asset suggestion during the development of the asset under development;

delivering the reusable asset to the integrated development environment in a list of suggested reusable assets to be presented as reusable asset suggestions during the development of the asset under development;

determining a scope of each of the suggested reusable assets, the scope describing a relevance of each of the suggested reusable assets for a current context of the asset under development based on the metadata associated with the asset under development;

determining a best fit of each of the suggested reusable assets for the current context of the asset under development according to the determined scope of each of the suggested reusable assets; and integrating the reusable asset into the asset under development in response to the user selecting the presented reusable asset from within the integrated development environment.

2. The computer program product of claim 1, the operations further comprising:

delivering the identified reusable asset to a development work environment for the asset under development.

3. The computer program product of claim 2, the operations further comprising:

delivering the identified reusable asset to the development work environment as a suggested reusable asset for completion of the asset under development.

4. The computer program product of claim 2, the operations further comprising:

delivering the identified reusable asset to the development work environment in a list of suggested reusable assets.

5. The computer program product of claim 1, the query term further comprising the descriptive term associated with the asset under development, the operations further comprising:

storing the query term on a memory.

6. The computer program product of claim 1, the operations further comprising:

storing the descriptive term and the plurality of synonym terms associated with the descriptive term in a nomenclature taxonomy dictionary.

7. The computer program product of claim 6, the operations further comprising:

identifying a candidate reusable asset of the plurality of reusable assets;

identifying a social network associated with the candidate reusable asset;

identifying terminology, from within the social network, which is descriptive of the candidate reusable asset; and storing the terminology descriptive of the candidate reusable asset in the nomenclature taxonomy dictionary.

8. The computer program product of claim 7, the operations further comprising:

mapping a first descriptive term of a first nomenclature of the terminology descriptive of the candidate reusable asset to a second descriptive term of a second nomenclature of the terminology descriptive of the candidate reusable asset.

9. The computer program product of claim 1, the operations further comprising:

indexing the plurality of reusable assets, the plurality of reusable assets being indexed based on a plurality of canonical terms.

10. The computer program product of claim 9, the operations further comprising:

storing the plurality of canonical terms with the indexed plurality of reusable assets.

11. A method for managing a community asset, the method comprising:

dynamically inferring, by a computer, a descriptive term that describes an asset under development from within an integrated development environment using metadata associated with the asset under development, the metadata comprising one or more of uniform modeling language diagrams, application programming interfaces, comments, and class parameters for the asset that is being developed, the asset under development comprising a source code asset, the computer comprising a processor and a memory;

extracting, by the computer, a plurality of synonym terms for the descriptive term from social network data associated with developers of a plurality of reusable assets based on one or more of author comment tags and version control system auditing information, the plurality of reusable assets comprising portions of source code that can be integrated into the asset under development within the integrated development environment;

normalizing, by the computer, the plurality of synonym terms within the social network data by identifying different synonym terms that each describe the same reusable asset in a different language and mapping the different synonym terms to one another;

describing, by the computer, at least one of the plurality of reusable assets based on the plurality of synonym terms;

identifying, by the computer, a query term comprising at least one of the plurality of synonym terms related to the descriptive term;

querying, by the computer, the plurality of reusable assets based on the query term;

identifying, by the computer, a reusable asset, of the plurality of reusable assets, the identification being based on results of the query, the identified reusable asset being for use in conjunction with the asset under development;

delivering the reusable asset to the integrated development environment in a list of suggested reusable assets to be presented as reusable asset suggestions during the development of the asset under development;

determining a scope of each of the suggested reusable assets, the scope describing a relevance of each of the suggested reusable assets for a current context of the asset under development based on the metadata associated with the asset under development;

determining a best fit of each of the suggested reusable assets for the current context of the asset under development according to the determined scope of each of the suggested reusable assets; and integrating the reusable asset into the asset under development in response to the user selecting the presented reusable asset from within the integrated development environment.

12. The method of claim 11, further comprising:

delivering the identified reusable asset to a development work environment for the asset under development.

13. The method of claim 11, further comprising:

creating a taxonomy associated with the plurality of reusable assets, the taxonomy comprising the descriptive term associated with the asset under development and a list of the synonym terms related to the descriptive term, the query term comprising a combination of the descriptive term and the list of synonym terms related to the descriptive term; and storing the taxonomy on the memory.

14. An apparatus to manage a community asset, the apparatus comprising:

a processor; and a memory comprising instructions which, when executed on a computer, perform operations comprising:

dynamically infer a descriptive term that describes an asset under development from within an integrated development environment using metadata associated with the asset under development, the metadata comprising one or more of uniform modeling language diagrams, application programming interfaces, comments, and class parameters for the asset that is being developed, the asset under development comprising a source code asset;

extract a plurality of synonym terms for the descriptive term from social network data associated with developers of a plurality of reusable assets based on one or more of author comment tags and version control system auditing information, the plurality of reusable assets comprising portions of source code that can be integrated into the asset under development within the integrated development environment;

normalize the plurality of synonym terms within the social network data by identifying different synonym terms that each describe the same reusable asset in a different language and mapping the different synonym terms to one another;

describe at least one of the plurality of reusable assets based on the plurality of synonym terms;

identify a query term comprising at least one of the plurality of synonym terms related to the descriptive term;

query the plurality of reusable assets based on the query term;

identify a reusable asset, of the plurality of reusable assets, the identification being based on results of the query, the identified reusable asset being for use in conjunction with the asset under development;

deliver the reusable asset to the integrated development environment in a list of suggested reusable assets to be presented as reusable asset suggestions during the development of the asset under development;

determine a scope of each of the suggested reusable assets, the scope describing a relevance of each of the suggested reusable assets for a current context of the asset under development based on the metadata associated with the asset under development;

determine a best fit of each of the suggested reusable assets for the current context of the asset under development according to the determined scope of each of the suggested reusable assets; and integrate the reusable asset into the asset under development in response to the user selecting the presented reusable asset from within the integrated development environment.

15. The apparatus of claim 14, the operations further comprising:

the identified reusable asset to a development work environment for the asset under development.

* * * * *